3,108,109
PROCESS FOR PRODUCING QUINOLINE
YELLOW DYES
Ray Allen Clarke, Pitman, N.J., assignor to E. I. du Pont de Nemours and Company, Wilmington, Del., a corporation of Delaware
No Drawing. Filed July 2, 1962, Ser. No. 207,055
3 Claims. (Cl. 260—289)

This invention is directed to a novel process for the manufacture of quinoline yellow dyes by condensation of a quinaldine sulfonic acid derivative with phthalic anhydride in the presence of dimethyl formamide which serves as partial solvent and catalyst for the reaction.

The conventional process for the manufacture of quinoline yellow dyes is to react a quinaldine derivative with phthalic anhydride with or without a diluent (see U.S. Patent 1,963,374) to form the quinophthalone. The quinophthalone is then sulfonated to obtain the water-soluble dye, i.e.

(A)
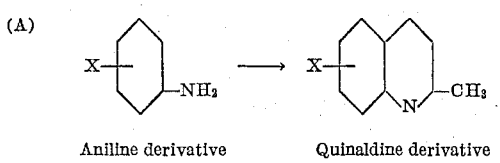
Aniline derivative    Quinaldine derivative (B)
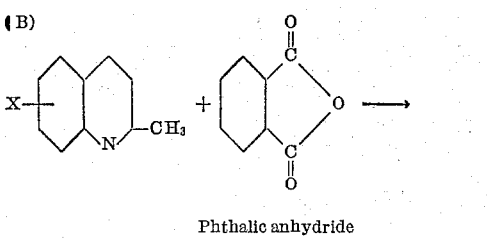
Phthalic anhydride

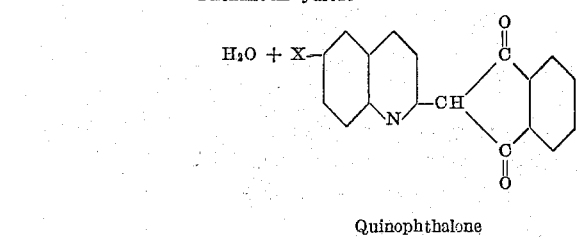
Quinophthalone (C)
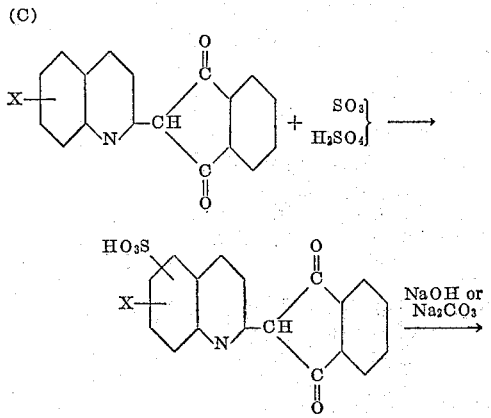

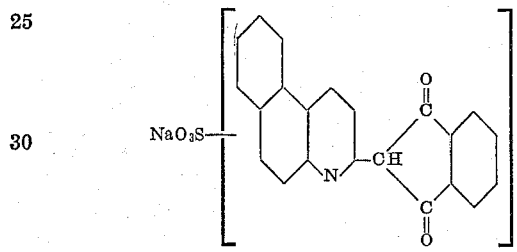
Quinoline yellow dye

X in the preceding reactions is a substituent such as methoxy, $CH_3$, Cl, or Br.

It is, therefore, an object of the present invention to provide a novel process for the preparation of quinoline yellow dyes. It is a further object of this invention to provide such a novel process which process involves the condensation of a sulfonated intermediate in a unique solvent medium.

These and other objects will become apparent in the following description and claims.

A particularly useful dye for coloring paper bright green-yellow shades was that made starting with 2-naphthylamine, instead of aniline in the above reaction scheme to obtain the product:

the water soluble dye after sulfonation of the benzoquinophthalone.

My attempts to make a quinoline yellow, which would have the same desirable dyeing properties on paper (exhaust over wider pH range) as the above dye, by conventional synthesis using a variety of aniline derivatives in place of 2-naphthylamine were generally unsuccessful.

The quinaldine sulfonic acid derivatives of the corresponding aniline or 2-naphthylamine sulfonic acids are readily prepared using the conventional method of preparation of quinaldine, that is, react the aniline or 2-naphthylamine sulfonic acid derivative with paraldehyde in strong acid solution—preferably hydrochloric acid, in the presence of an oxidizing agent such as nitrobenzene-m-sulfonic acid or p-nitrotoluene-o-sulfonic acid (para acid), see U.S. Patent 2,035,751, and copper sulfate.

Significantly, I have discovered that the quinaldine sulfonic acid can be condensed with phthalic anhydride in the presence of a reaction promoter selected from the group consisting of dimethylacetamide and dimethyl formamide (DMF) at temperatures in the range of 160° to 200° C. (preferably 180±5° C.) for a period of 8 to 20 hours. The dye is isolated by drowning the reaction mass in hot water and removing the dye by filtration. While the isolation procedure may vary from dye to dye, a typical procedure would be to neutralize the excess phthalic anhydride (as acid) with sodium hydroxide or sodium carbonate and then to salt the dye out of solution and to isolate the dye by filtration. This condensation process should be conducted in the presence of at least one mole of said reaction promoter per mole of sulfoquinaldine derivative; optionally, there may be present 5% or more, based on the weight of said promoter of a salt of a strong base and a weak acid. The following scheme of reactions summarizes this procedure:

(A)

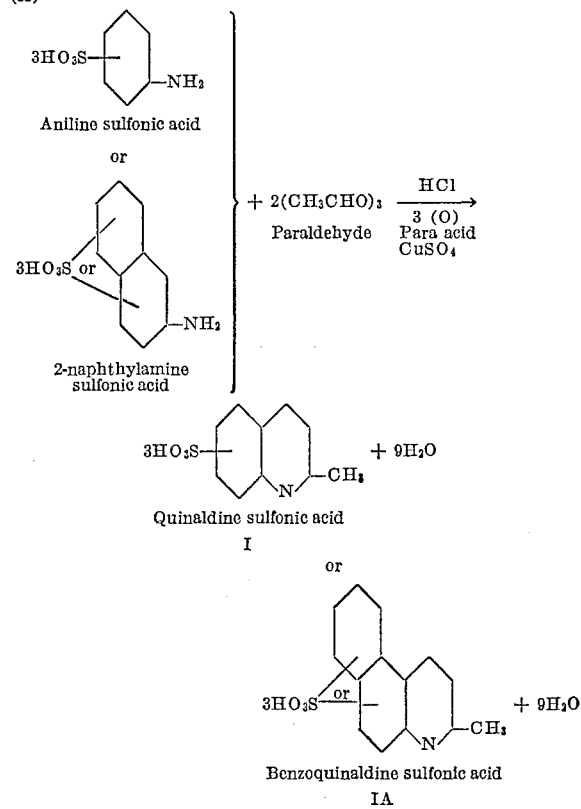

(B)

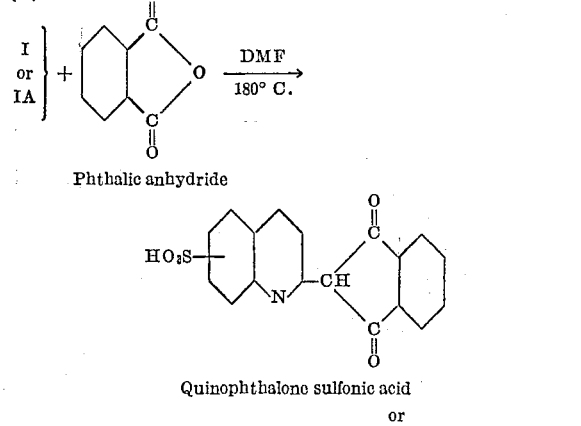

The advantages of my novel process are several:

(a) In case of the 2-naphthylamine derivative, the hazard of the free amine is overcome by using the sulfonic acid;

(b) My process is more economical; less solvent, more concentrated reaction mass;

(c) By virtue of being able to locate sulfonic acid groups in various known positions, the properties of the dyes may be varied, and effects of this group in different locations in the molecule may be studied and controlled;

(d) Specific physical mixtures of dyes may be used which afford more desirable dyeing properties over the single dye isomer; and (e) Improved yields and improved dye strength are often obtained in the practice of my process.

The following examples are representative and will serve to demonstrate the process for the preparation of the quinaldine sulfonic acid derivatives which are used to make the quinoline yellow dyes according to the present invention.

PART I—QUINALDINE DERIVATIVES

Example 1

187 parts of 4-amino-m-toluenesulfonic acid, 42 parts of 5-nitro-o-toluenesulfonic acid and 12 parts of $CuSO_4 \cdot 5H_2O$ are added to 695 parts of 15.8% hydrochloric acid. The agitated mixture is heated to 100° C. and 100 parts of paraldehyde are added over a 5-hour period. The reaction mass is heated 2 hours longer at 100° C. and then cooled to room temperature. The 2,8-dimethyl-6-quinoline-sulfonic acid which precipitates is filtered off, washed with water and dried. It has the formula:

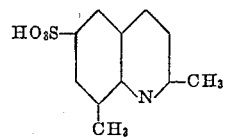

Example 2

223 parts of 6-amino-2-naphthalenesulfonic acid, 42 parts of 5-nitro-o-toluenesulfonic acid and 12 parts of $CuSO_4 \cdot 5H_2O$ are added to 1178 parts of 11.9% hydrochloric acid. The agitated mixture is heated to 100° C. and 100 parts of paraldehyde are added over a 7-hour period. After cooling the reaction mass to room temperature, the precipitated 3-methyl-benzo[f]quinoline-8-sulfonic acid of the formula:

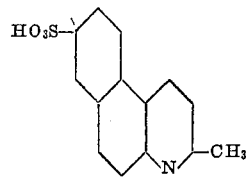

is filtered off, washed with 5% hydrochloric acid to displace the brown mother liquor, and dried.

Example 3

Following the general processes described in Examples 1 and 2, quinaldine derivatives were prepared by starting with the following aromatic amino sulfonic acids:

(a) Sulfanilic acid
(b) Metanilic acid
(c) 6-amino-m-toluenesulfonic acid
(d) 6-amino-4-chloro-m-toluenesulfonic acid
(e) 4-methoxymetanilic acid
(f) 7-amino-1-naphthalenesulfonic acid
(g) 6-amino-1-naphthalenesulfonic acid
(h) 50:50 mixture of 6- and 7-amino-1-naphthalenesulfonic acids
(i) 3-amino-2,7-naphthalenedisulfonic acid
(j) 3-amino-1,7-naphthalenedisulfonic acid
(k) 7-amino-1,3-naphthalenedisulfonic acid
(l) 6-amino-1-naphthol-3-sulfonic acid
(m) 7-amino-1-naphthol-3-sulfonic acid When the 2-methylquinolinesulfonic acids thus obtained are condensed with phthalic anhydride according to procedures described below, one obtains green-yellow dyes for paper which exhibit excellent strength and brilliance when applied to bleached sulfite pulp.

PART II—QUINOPHTHALONE DERIVATIVES

*Example 4*

(a) A mixture consisting of 20 parts of 2-methyl-6-quinolinesulfonic acid sodium salt, 42 parts of phthalic anhydride and 14 parts of dimethylformamide is agitated at 175° to 180° C. for 16 hours. The reaction mass is then poured into 400 parts of a 7.5% salt (NaCl) solution at 70° C. A 30% solution of NaOH is added to convert any excess phthalic anhydride to sodium phthalate and the pH is adjusted to 7.0 to 8.0. The condensation product (6′-sulfoquinophthalone) precipitates upon cooling to about 45° C., and is filtered off. It is washed with a 7.5% NaCl solution and dried. This dye has the formula:

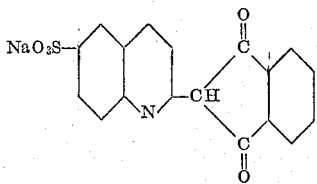

and may also be named 2-(1,3-dioxo-2-indanyl)-6-quinolinesulfonic acid sodium salt. In aqueous solution it has a maximum absorption peak at 408 millimicrons. It dyes paper of bond grade a bright green-yellow shade which is similar in hue but much stronger than the sulfonated quinophthalone of commerce known as C.I. Acid Yellow 3.

(b) When part (a) of this example is repeated except that 20 parts of the 2-methyl-6-quinolinesulfonic acid, sodium salt are replaced by 19.4 parts of 2,8-dimethyl-6-quinolinesulfonic acid, one obtains the corresponding quinophthalone, 2-(1,3-dioxo-2 - indanyl)-8-methyl-6-quinolinesulfonic acid, sodium salt. This dye is similar in shade (absorption peak at 405 millimicrons) to the dye of part (a), and exhibits excellent application properties on bleached sulfite pulp when applied with rosin size and alum as described hereinafter.

*Example 5*

A mixture consisting of 68 parts of 3-methylbenzo[f]quinoline-8-sulfonic acid (prepared from 6-amino-2-naphthalenesulfonic acid as described in Part I), 148 parts of phthalic anhydride and 42 parts of dimethylformamide is agitated at 175° to 180° C. for 22 hours. The fluid reaction mass is then drowned into 2300 parts of water containing 188 parts of NaCl. The slurry thus obtained is stirred at 75° C. in the presence of sufficient sodium hydroxide to provide a pH of 8. The slurry is filtered at 75° C. and the filter cake is sucked well, and dried. The yellow dye thus obtained has the structure:

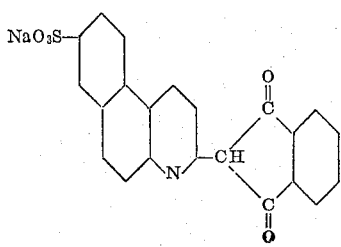

An aqueous solution of this dye has a maximum absorption peak 411 millimicrons, and dyes bleached sulfite pulp in the presence of rosin size and alum in shades similar to those obtained from C.I. Direct Yellow 5.

*Example 6*

A mixture consisting of 118 parts of the quinaldine derivative prepared in Example 3(k), 3-methylbenzo[f]quinoline-8,10-disulfonic acid of the formula:

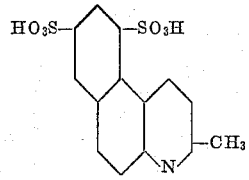

148 parts of phthalic anhydride and 60 parts of dimethylformamide is stirred at 180° to 185° C. for 20 hours. The reaction mass is drowned in 1350 parts of a 20% NaCl solution, and the resulting slurry is made alkaline by addition of sodium carbonate. After heating the slurry to 90° C. it is cooled to 50° C., and the dye is filtered off. It has the structure:

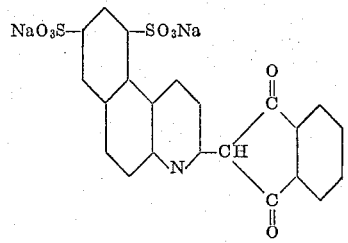

and may be named 3-(1,3-dioxo-2-indanyl)benzo[f]quinoline-8,10-disulfonic acid, sodium salt.

The dye of this example is obtained in excellent yield. Its aqueous solution has a maximum absorption peak at 410 millimicrons and dyes paper in green-yellow shades of excellent strength over a dyeing pH range of 4 to 6.

*Example 7*

(a) A mixture of 15 parts of the quinaldine derivative prepared in Example 3(i), 25 parts of phthalic anhydride and 14 parts of dimethylformamide is heated at 175° to 180° C. for 18 hours with frequent stirring. The reaction mass is poured into 300 parts of water and the whole is adjusted to pH 8.5 by adding a 30% aqueous NaOH solution. The precipitated dye is filtered off and half of the filter cake is dried. The dye exhibits a maximum absorption peak at 428 millimicrons, and is represented by the formula:

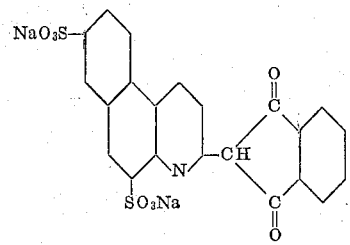

This dye may be named 3-(1,3-dioxo-2-indanyl)benzo[f]quinoline-5,8-disulfonic acid, sodium salt. It dyes bleached sulfite pulp in green-yellow shades, and exhibits much better affinity for cellulose than that shown by the isomeric dye of Example 6.

(b) Alternate method of isolation: The remaining half of the filter cake obtained in part (a) of the present example is dispersed in 100 parts of water and 30 parts of 37% hydrochloric acid. The dispersion is stirred at 90° to 95° C. for 10 minutes, after which the free acid form of the dye is filtered off and dried.

By dry mixing the dye thus obtained with an alkaline salt such as sodium carbonate, sodium metasilicate, sodium tetraphosphate or sodium borate, the mixture dissolves readily in water to afford neutral or alkaline dye solutions which exhibit excellent properties for dyeing paper pulp.

Example 8

A mixture of monosulfo isomers consisting of the 3-methylbenzo[f]quinoline-7,8 and 10-sulfonic acids in the following amounts:

|  | Parts |
|---|---|
| 7-sulfo isomer | 27 |
| 8-sulfo isomer | 14 |
| 10-sulfo isomer | 27 | is reacted with 112 parts of phthalic anhydride in the presence of 56 parts of dimethylformamide at 180° C. for 18 hours. The reaction mass is drowned in 2000 parts of water, the solution is heated to 90° C. and clarified hot through filter cloth. The filtrate is acidified with 590 parts of 37% hydrochloric acid, and heated at 90° to 95° C. for one hour, causing the dye dispersion to change from a yellow to a red-orange color. The dye, now predominantly in the free sulfonic acid form, is filtered off at 60° C. and dried.

By dry mixing said dye with one or more of the alkaline salts as described in part (b) of Example 7, one obtains a product which is characterized by excellent dyeing properties when applied to paper pulp by the usual methods well known in the trade. One such method is described in Example 10.

Example 9

A mixture consisting of 60 parts of 2,8-dimethyl-6-quinolinesulfonic acid (Example 1), 148 parts of phthalic anhydride, 50 parts of dimethylacetamide and 6 parts of sodium acetate is heated at 175° to 185° C. for 20 hours. The condensation product is isolated by the procedure described in Example 4(a). The structure and properties of the dye thus obtained correspond with those of the dye described in Example 4(b).

When the sodium acetate used in the present example is replaced by a like amount of a salt of a strong base and a weak acid, e.g. alkali metal phosphates, carbonates, borates and aliphatic carboxylates including such specific members of this group as potassium acetate, tetra sodium pyrophosphate, sodium or potassium carbonate, and sodium borate, one obtains similar results.

Example 10
TYPICAL DYEING PROCEDURES

One-tenth (0.1) part of the dye prepared as described in Example 4(b) is added to an aqueous slurry of 100 parts (dry basis) of bleached sulfite pulp in 5000 parts of water at 2° to 38° C. Two parts each of rosin size and alum ($Al_2(SO_4)_3 \cdot 18H_2O$) are then added, the mixture is thoroughly agitated for 10 to 20 minutes and water is added to give a total of 20,000 parts. Paper sheet is then made up in the manner well known in the art of papermaking to provide yellow-colored paper. A shade of medium strength is obtained.

The amount of dye employed in the present dyeing procedure may be varied from 0.01 to 1.0 part to give lightly-tinted to deeply-colored dyeings. The percent by weight of air-dried paper pulp in the initial slurry may vary from 0.4 to 3. Likewise, the amount of rosin size and alum used in the process may vary from about 0.5 to 3 parts and from 1 to 4 parts, respectively.

The sulfo-quinaldine derivatives may be reacted with phthalic anhydride in excess phthalic anhydride (5 to 10 mole excess) to obtain the desired quinophthalone dye and provide a fluid reaction mass. However, when using a relative small amount of dimethylformamide according to the present invention, one is able to effect the following advantages: (a) reduce considerably the amount of phthalic anhydride, (b) approximately double the reaction rate, and (c) improve the yield and quality of dye.

Noticeable improvements, noted above, are observed when only one mole of dimethylformamide is employed per mole of the sulfo-quinaldine derivative. The upper limit in the amount of dimethylformamide employed is not critical, being dictated by consideration of economics.

The time required to complete the condensation reaction with phthalic anhydride varies from one sulfo-quinaldine compound to another. Good yields have been obtained within a heating period of 5 to 8 hours. In other instances, 12 to 24 hours are required for yields approximating the theoretical amount. Generally, a period of 16 to 20 hours is sufficient.

In general, one may employ either the free $SO_3H$ form or the alkali metal or ammonium salt of the sulfo-quinaldine derivative in my novel process. The free acid form is preferred because, in some instances, as with certain disulfonic acids, the salt forms give reduced yields or require longer heating periods.

Dimethylacetamide (DMAC) is one of the reaction promoters which may be utilized in the practice of the present invention; it is similar to dimethyl formamide (DMF) in numerous ways even though it has a higher boiling point than DMF. Although DMF is my preferred reaction promoter, when a salt such as sodium acetate is employed in small amount, say 10% by weight of DMAC, along with the latter, one obtains excellent yields of dye without using unreasonably large amounts of DMAC as exemplified by Example 9.

In the practice of my novel process, about 2 moles of phthalic anhydride may be used, but it is preferred to use about 3 or more moles of phthalic anhydride per mole of the sulfo-quinaldine derivative in order to obtain maximum yields and purity of final dye in minimum reaction time.

The present novel process represents a technically significant advance in the art, as said process, for the first time, achieves a successful reaction between a sulfo-quinaldine compound and phthalic anhydride, to form the corresponding sulfo-quinophthalone derivative.

The preceding representative examples may be varied within the scope of the present total specification disclosure, as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing quinoline yellow dyes wherein a sulfonated intermediate selected from the group consisting of (a) a 2-methyl quinoline sulfonic acid compound of the structure:

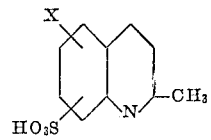

wherein X is a radical selected from the group consisting of H, methyl and methoxy and (b) a 3-methylbenzoquinoline sulfonic acid compound of the structure:

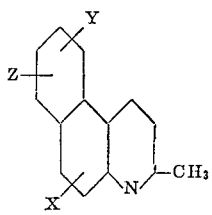

wherein Y is a radical selected from the group consisting of $SO_3H$, H and OH; Z and X are radicals selected from the group consisting of H and $SO_3H$ with the proviso that three sulfonic acid radicals cannot be present in a given structure and that when Y is OH, X must be H, said intermediate being condensed with phthalic anhydride in then presence of a reaction promoter taken from the group consisting of dimethylformamide, dimethyl acetamide and mixtures of said amide reaction promoters with at least 5% by weight of said promoter of a salt of a strong base and a weak acid.

2. A process according to claim 1 wherein the reaction promoter is dimethylformamide.

3. A process according to claim 1 wherein the reaction promoter is a mixture of dimethylacetamide with at least 5% sodium acetate.

No references cited.